United States Patent [19]

Shoji

[11] 4,365,769
[45] Dec. 28, 1982

[54] MAGNETIC TAPE CASSETTE

[75] Inventor: Shigemasa Shoji, Tokyo, Japan

[73] Assignee: TDK Electronic Co., Ltd., Tokyo, Japan

[21] Appl. No.: 212,614

[22] Filed: Dec. 3, 1980

[30] Foreign Application Priority Data

Jan. 14, 1980 [JP] Japan .............................. 55-3246[U]

[51] Int. Cl.³ ...................... B65H 27/00; G03B 1/04
[52] U.S. Cl. ........................................ 242/199; 242/76
[58] Field of Search .................. 242/55.19 A, 129.53, 242/194, 197–200, 76; 226/193, 196–199; 360/93, 96.1, 132

[56] References Cited

U.S. PATENT DOCUMENTS 3,682,604  8/1972  Girard et al. ........................ 428/680
4,191,345  3/1980  Sato et al. ........................... 242/197

Primary Examiner—Leonard D. Christian
Attorney, Agent, or Firm—Oblon, Fisher, Spivak, McClelland & Maier

[57] ABSTRACT

A magnetic tape cassette having a tape guide coated with nickel-tin alloy plating on the surface which is in slide-contact with a magnetic tape.

1 Claim, 3 Drawing Figures

MAGNETIC TAPE CASSETTE

BACKGROUND OF THE INVENTION

1. Field of the Invention

The present invention relates to a magnetic tape cassette such as a video tape cassette.

2. Description of the Prior Art

FIG. 1 and FIG. 2 are schematic views of the conventional magnetic tape cassette wherein reels (4), (5) holding a wound magnetic tape (3) are positioned in a casing comprising an upper half casing (1) and a lower half casing (2) and tape guides (6), (7), (8) for guiding the magnetic tape (3), and a tape pad (9) are provided in the running path of the magnetic tape (3) between the reels (4), (5) so that the magnetic tape (3) can move continuously in contact with these elements (6) to (9) to be wound on the reel. The reference numerals (10) and (11) designate guide poles.

In the conventional magnetic tape cassette, the tape guides (6) to (8) made of stainless steel are coated with a hard chrome plating or a nickel plating or are subjected to surface-grinding to reduce their frictional resistance to the magnetic tape (3) so as to assure a smooth running of the magnetic tape (3). However, the smooth running of the magnetic tape is sometimes prevented by a load applied when winding the magnetic tape, due to the frictional resistance of the tape guides (6) to (8) to the magnetic tape (3) even though one of the above described surface treatments is applied to the tape guides. Especially, when a winding torque of a tape deck is small or when the magnetic tape (3) is wound under tension in a case of a rapid feeding or a rapid returning from the stopped state or in a case of a rapid feeding or a rapid returning from the recorded picture-reproducing state, the magnetic tape comes into close contact with the tape guides so that the static frictional coefficient is high. Thus, a large load is applied to the magnetic tape (3) to prevent the winding of the magnetic tape (3) resulting in non-running of the tape. This phenomenon occurs depending upon environmental conditions such as surface property of the tape guides, temperature and humidity which occasionally causes the running trouble of the magnetic tape.

SUMMARY OF THE INVENTION

It is an object of the present invention to overcome the disadvantage of the conventional tape cassette and to provide a magnetic tape cassette allowing a smooth running of a magnetic tape under any environmental condition.

The foregoing and the other objects of the present invention have been attained by providing a magnetic tape cassette comprising a tape guide in which the surface in slide contact with a magnetic tape is coated with a nickel-tin alloy plating.

DETAILED DESCRIPTION OF THE PREFERRED EMBODIMENTS

Figure 1:
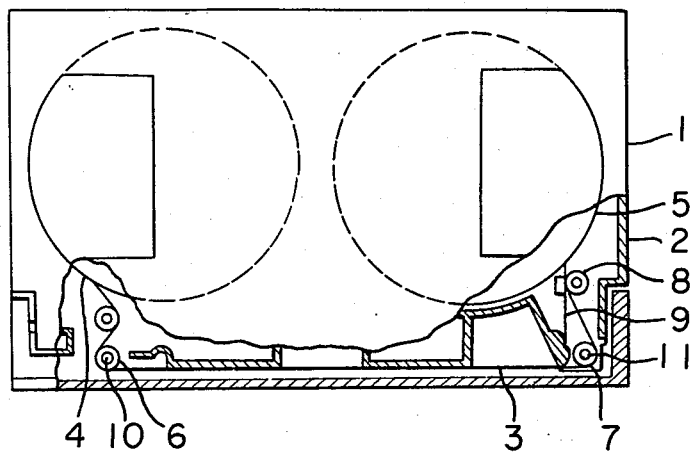
FIG. 1 is a partially sectional plan view of the conventional magnetic tape cassette.
Figure 2:
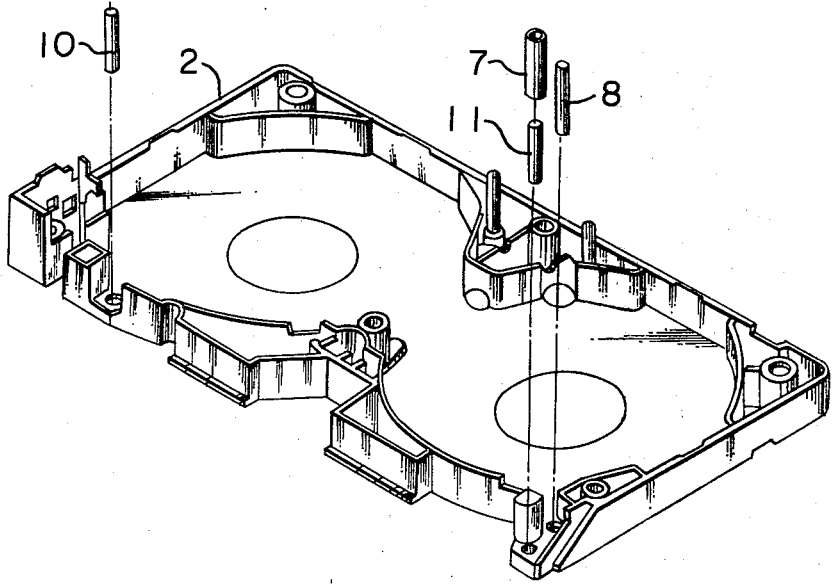
FIG. 2 is an enlarged schematic view of the magnetic tape cassette in a disassembled state.
Figure 3:
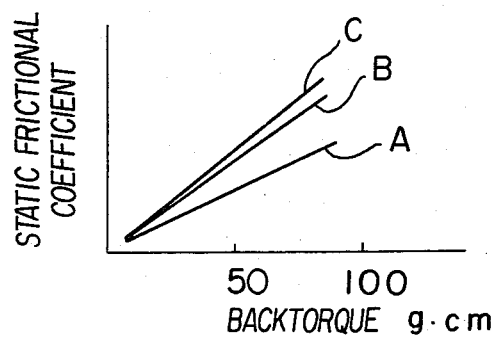
FIG. 3 is a graph showing measured data of static frictional coefficient - back torque characteristics of magnetic tape cassettes of the present invention and the conventional magnetic tape cassette.

The present invention is characterized by applying nickel-tin alloy plating onto the surface of a tape guide (6), (7) or (8) of the magnetic tape cassette shown in FIGS. 1 and 2. Thus, when the nickel-tin alloy plating is applied to the tape guide (6), (7), or (8), the static frictional coefficient for the surface is given as a curve A shown in FIG. 3 which shows a remarkable reduction of the static frictional coefficient in comparison with that of the tape guide coated with the hard chrome plating (shown as a curve B) or that of the tape guide made of stainless steel which is processed by surface-grinding (shown as a curve C), as the conventional technique. More specifically, the tape guide of the present invention is greatly improved in comparison with the stainless steel tape guide which is surface-ground and a 20 to 40 percent reduction of the static frictional coefficient can be attained. The nickel-tin alloy plating has a hardness in the middle range between those of hard chrome plating and nickel plating and is much harder than stainless steel and has the advantages of greater damage-resistance and easy preparation.

As described above, a magnetic tape cassette of the present invention comprises a tape guide coated with nickel-tin alloy plating on the surface in slide contact with a magnetic tape so as to greatly reduce the frictional resistance to a running magnetic tape. Thus, a magnetic tape cassette having a high reliability which does not cause any running trouble can be provided even when a rapid feeding or a rapid returning is required or when the winding torque of a tape deck is small.

The hardness of the surface of the tape guide is increased so that wearing and scaring of the surface that occurs when the magnetic tape is running are reduced and scratches on the magnetic tape can be prevented advantageously.

I claim:

1. A magnetic tape cassette which comprises a tape guide coated with nickel-tin alloy plating on the surface in slide contact with a magnetic tape.

* * * * *